Patented Nov. 14, 1950

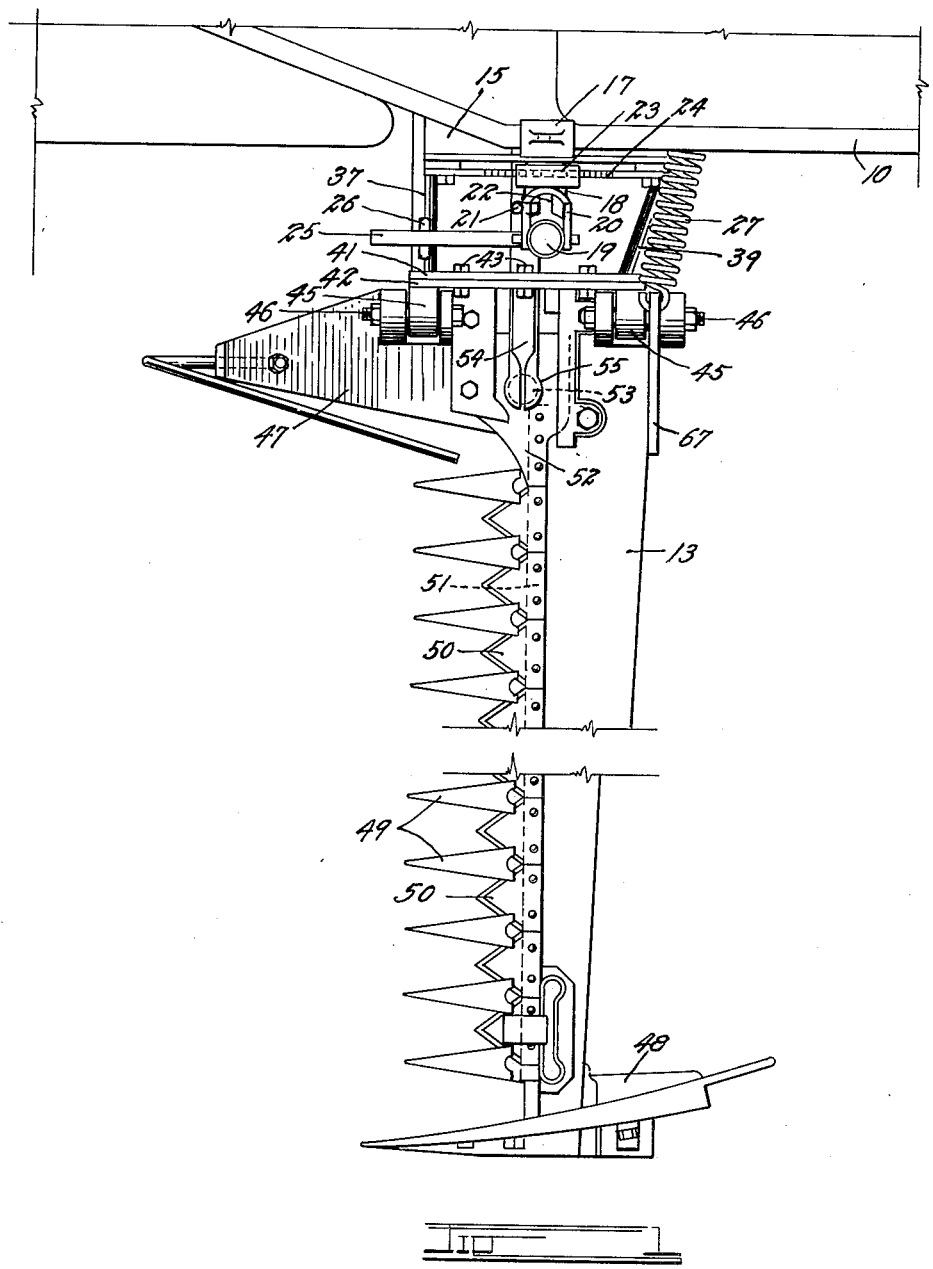

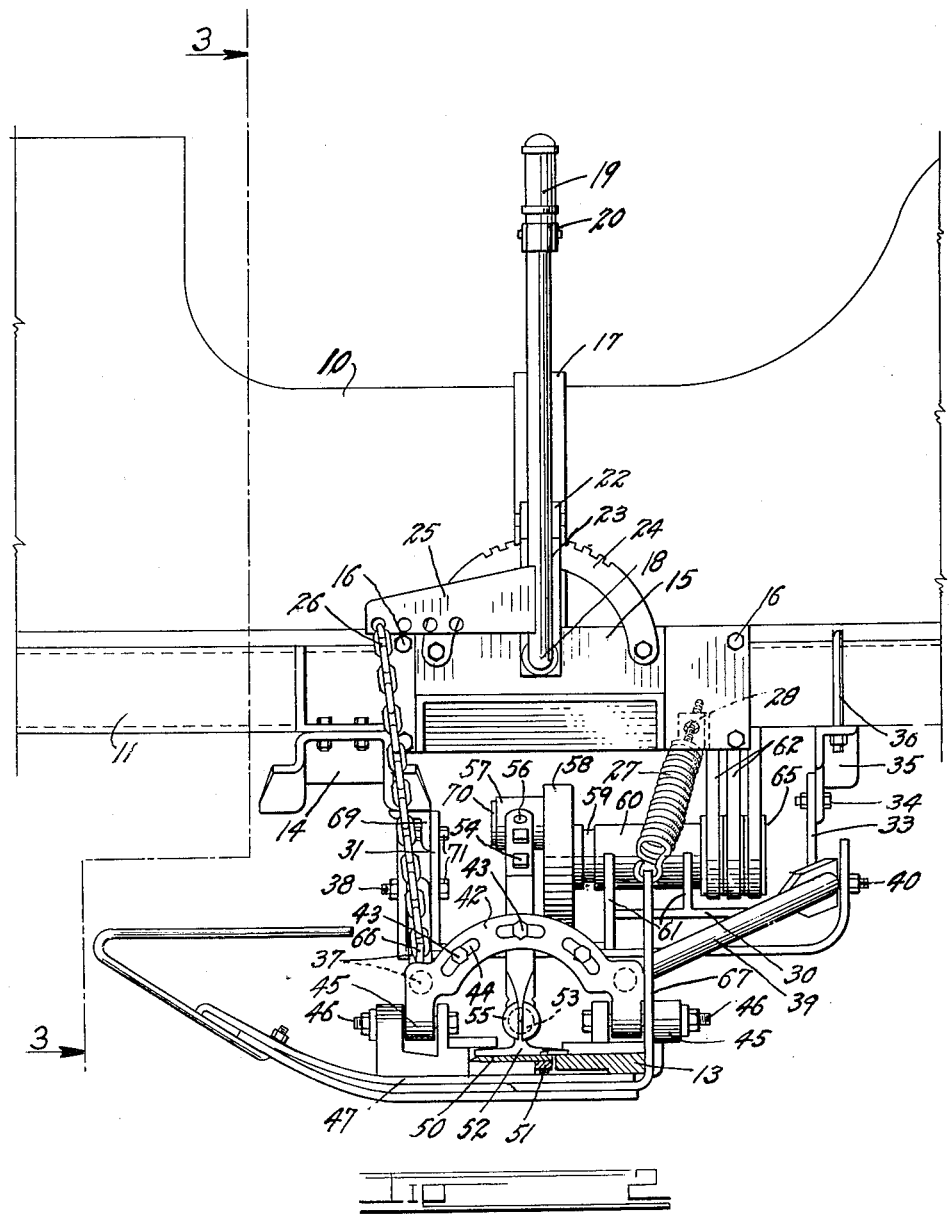

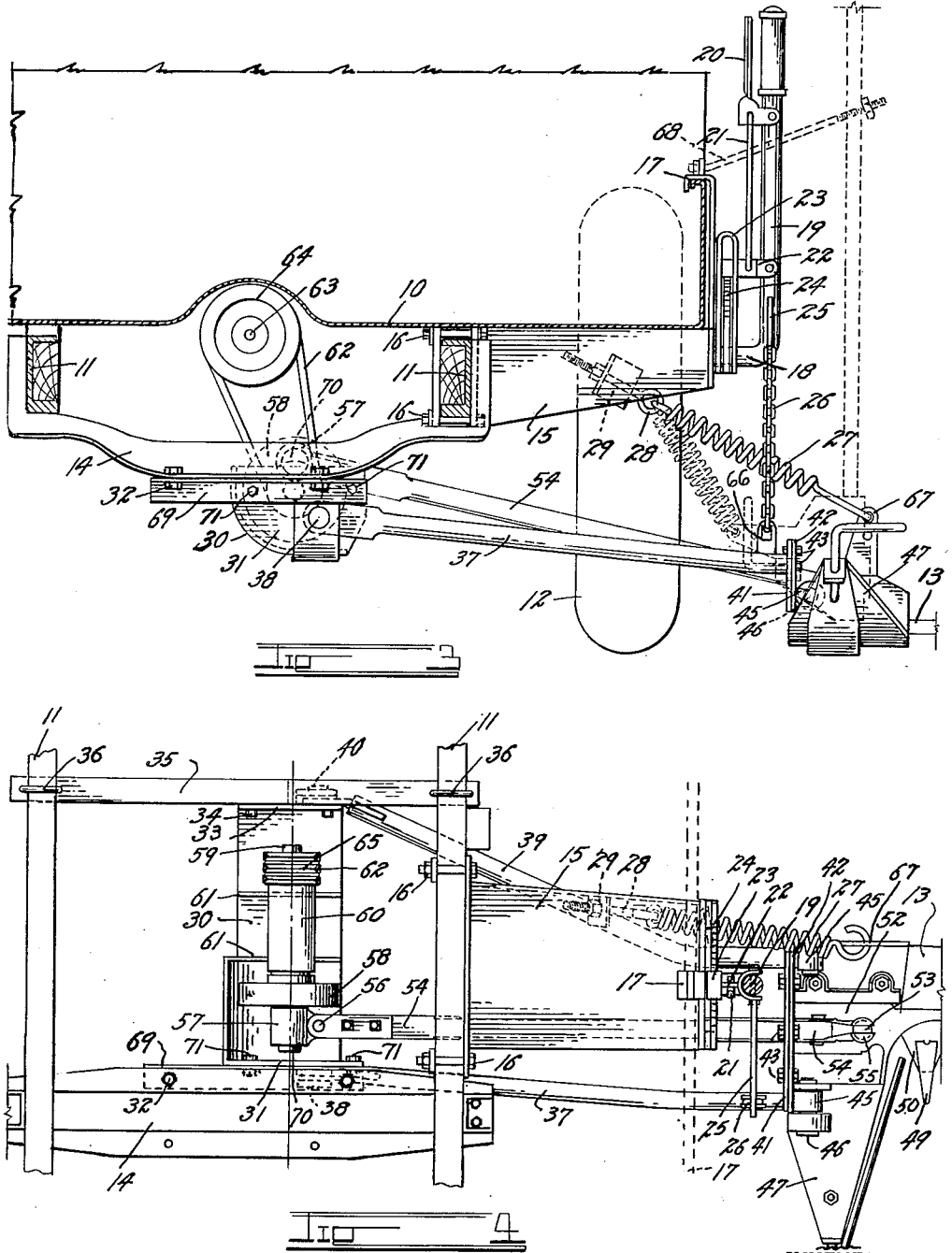

2,529,612

UNITED STATES PATENT OFFICE 2,529,612

MOWER ATTACHMENT FOR MOTOR VEHICLES

Allan J. Kayser, Denver, Colo.

Application February 4, 1948, Serial No. 6,257

1 Claim. (Cl. 56—25)

This invention relates to a mower attachment for the presently popular small, four-wheel drive, automotive vehicles popularly known as "jeeps", and has for its principal object the provision of means whereby a mower bar can be quickly and easily attached to, or detached from, the vehicle so that it will be easily visible and easily controlled by the driver of the vehicle.

Another object of the invention is to provide highly efficient means whereby the angle of attack of a mower bar may be adjusted to suit the desires of the user and the requirements of the particular crop being harvested.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a fragmentary plan view of the improved attachment in place on the vehicle;

Fig. 2 is a side view of the vehicle, with the invention in place thereon;

Fig. 3 is an enlarged cross-section through the vehicle, taken on the line 3—3, Fig. 2, illustrating the attachment means; and Fig. 4 is a fragmentary plan view of the attachment as it would appear with the floor and body of the vehicle removed.

In the drawing, the body of a four-wheeled drive vehicle of the "jeep" type is indicated at 10, with its chassis at 11, transverse brace member at 14, wheels at 12, power take-off shaft at 63 and power take-off pulleys at 64.

This invention is designed for attaching a conventional mower bar 13 to the vehicle so that it may be driven by the power take-off pulleys 64. Since the driver of such a vehicle is positioned on the left side, this invention is designed to project the mower bar 13 from the left side so that it will be easily visible to the driver from his driving position.

The invention is applied to the vehicle by securing a channel-like brace plate 15 to the left of the chassis 11 by means of clamp bolts 16. The plate 15 extends outwardly from the chassis 11 to a position substantially in alignment with the side of the body 10 of the vehicle. A hook bar 17 extends upwardly from the outer extremity of the plate 15 and hooks over the side of hte body 10 to support the weight of the projecting extremity of the plate 15.

A lever shaft 18 projects from and is rotatably mounted on the outer extremity of the plate 15. The lever shaft is turned upwardly to form a hand lever 19, provided with a hand grip 20 which, through the medium of a connecting link 21, lifts a latch 22. The latch 22 rides in a vertical slot in a U-shaped guide member 23 which is secured on and rotates with the shaft 18. The latch member engages teeth in a quadrant plate 24 to support the lever 19 in any desired position.

It will be noted that the latch member extends through both sides of the U-shaped guide member 23 so that the strain is absorbed between the guide member 23 and the quadrant 24 and is not transmitted to the lever 19.

A lifting lever 25 is welded or otherwise secured to the lever 19 and projects forwardly therefrom to receive a hanging chain 26 from which the weight of the mower is partially supported. The remainder of the weight of the mower is supported from a tension spring 27 extending to an eye-bolt 28 which is adjustably mounted in an angle clip 29 welded or otherwise secured to one of the side flanges of the frame plate 15.

The mower portion of the device is supported from a saddle plate 30, one extremity of which is turned upwardly to form a front side plate 31 which is bolted to an angle bar 69 by means of suitable bolts 71 which in turn is bolted to the bottom of the strut 14 by means of attachment bolts 32. The other extremity of the saddle plate 30 is turned upwardly to form a rear side plate 33 which is bolted by means of attachment bolts 34 to a cross angle 35. The cross angle 35 is secured beneath the chassis 11 by means of U-bolts 36.

A toggle link 37 extends from a hinge pin 38 on the plate 31 outwardly to the left of the vehicle. A second diagonal toggle link 39 extends from a similar hinge pin 40 on the side plate 33 outwardly in the plane of the link 37. The extremities of the links 37 and 39 terminate in and are secured to an arcuate separating member 41 extending at right angles to the axis of the links.

An adjustable arcuate plate 42 is secured to the face of the arcuate member 41 by means of clamp bolts 43. The bolt holes in the plate 42 are arcuately elongated as shown at 44 so that the plate 42 may be rotated and set in any designed circumferential position. The plate 42 carries two aligned bearing bosses 45 through each of which a hinge pin 46 passes.

The pins 46 hingedly mount an inner mower shoe 47 to the plate 42. The mower bar 13 is secured to and projects from the shoe 47 terminating in an outer shoe 48. A plurality of guards 49 are secured to and project from the mower bar 13 in the conventional manner. A plurality of sickle blades 50 are secured to a sickle bar 51 and reciprocate between the guards 49 as is usual in mower bar construction. The sickle bar 51 terminates in a sickle plate which is reciprocally mounted in the shoe 47. The sickle plate 52 carries a joint ball 53 from which a pitman rod 54 extends. The pitman rod 54 is connected to the ball 53 by means of a conventional ball socket joint at its one extremity and terminates at its other extremity in a hinge pin 56, carried by a crank bearing 57. The bearing 57 is mounted on an eccentrically positioned crank pin projecting from a pitman disc 58 secured on a counter-shaft 59. The counter-shaft 59 is journalled in an elongated bearing sleeve 60 which is supported on transverse bracket plates 61 extending upwardly from the saddle plate 30. The counter-shaft 59 is driven by means of multiple V-belts 62.

Vehicles of the type to which this invention is applicable are provided with power-take-off shafts 63 and power-take-off pulleys 64. The belts 62 extend from the take-off pulleys 64 to driven pulleys 65 on the counter-shaft 59. The hanging chain 26 extends to a chain clip 66 welded or otherwise secured on the toggle link 37. The spring 27 extends to a spring ear 67 formed on the inner shoe 43.

The operation of the mower is similar to that of the usual mower. The vehicle is driven over the field on the right of the crop so that the mower bar will cut the next swath therefrom. The height of the cut can be adjusted from the driver's position by means of the hand lever 19 which acts through the chain 26 to lift the toggle links 36 and 37. The lift is assisted and counterbalanced by the spring 27. The cutting angle of the sickle can be adjusted by loosening the bolts 43 and swinging the plate 42 on the arcuate member 41.

When not in use the entire mower bar with its assembled elements can be swung vertically and attached to the hook member 17, as shown in broken line in Fig. 1, by means of a tie rod 68. The sickle can be rendered inoperative by throwing out the power-take-off clutch with which such vehicles are provided.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

Means for supporting a mower bar attachment from a vehicle having a chassis and a body projecting sidewardly beyond said chassis, comprising: a brace plate secured to one side of said chassis and projecting sidewardly beneath and beyond said body; a hooked bar secured to and extending upwardly from said brace plate, thence inwardly over a portion of said body to support the outer extremity of said brace plate; and means for suspending said mower bar attachment from said brace plate.

ALLAN J. KAYSER.

REFERENCES CITED

The following references are of record in the file of this patent:

UNITED STATES PATENTS

| Number | Name | Date |
|---|---|---|
| 2,105,125 | Meinholdt | Jan. 11, 1938 |
| 2,187,981 | Martin | Jan. 23, 1940 |
| 2,214,162 | Clapper | Sept. 10, 1940 |
| 2,422,044 | Ronning et al. | June 10, 1947 |